United States Patent [19]

Vamvakaris et al.

[11] 4,271,303
[45] Jun. 2, 1981

[54] HETEROCYCLIC COMPOUNDS

[75] Inventors: Christos Vamvakaris, Kallstadt; Peter Neumann, Wiesloch; Manfred Patsch, Wachenheim, all of Fed. Rep. of Germany

[73] Assignee: BASF Aktiengesellschaft, Ludwigshafen, Fed. Rep. of Germany

[21] Appl. No.: 58,838

[22] Filed: Jul. 19, 1979

[30] Foreign Application Priority Data

Jul. 19, 1978 [DE] Fed. Rep. of Germany ....... 2831673

[51] Int. Cl.³ .............................................. C09B 57/04
[52] U.S. Cl. ................................... 546/155; 546/157; 548/326; 548/327
[58] Field of Search ....................... 546/155, 157, 110; 548/326, 327; 260/326.1

[56] References Cited

U.S. PATENT DOCUMENTS 3,923,806  12/1975  Bock et al. ........................... 548/327
4,051,099  9/1977  von der Crone ................... 260/40 P

FOREIGN PATENT DOCUMENTS 2041999  3/1972  Fed. Rep. of Germany ........ 260/326.1

Primary Examiner—Donald G. Daus
Assistant Examiner—Diana G. Rivers
Attorney, Agent, or Firm—Oblon, Fisher, Spivak, McClelland & Maier

[57] ABSTRACT

Compounds of the formula

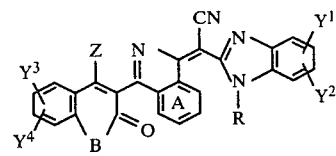

where B is oxygen, sulfur, imino or $>N-R^1$, the ring A may be substituted, and R, $Y^1$ to $Y^4$ and Z are conventional dye substituents.

The compounds according to the invention give brilliant, very fast dyeings on polyesters and mass-colorations of plastics.

2 Claims, No Drawings

HETEROCYCLIC COMPOUNDS

The present invention provides novel heterocyclic compounds which in one of the possible tautomeric forms correspond to the general formula I

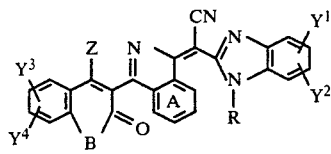

where B is oxygen, sulfur, NH or

R is $C_1$-$C_8$-alkyl which may or may not be interrupted by oxygen and is unsubstituted or substituted by hydroxyl, phenoxy, cyano, $C_1$-$C_4$-alkoxycarbonyl, hydroxycarbonyl, $C_1$-$C_4$-alkanoyloxy, unsubstituted or N-substituted carbamoyl or phenyl, or is phenyl which is unsubstituted or substituted by chlorine, bromine, methyl, ethyl, methoxy or ethoxy, or is $C_1$-$C_4$-alkoxycarbonyl or cyano, or is unsubstituted or N-substituted carbamoyl, or, if B is sulfur, NH or —N—$R^1$,

may also be hydrogen, $R^1$ is $C_1$-$C_4$-alkyl or benzyl, $Y^1$ is hydrogen, chlorine, bromine, $C_1$-$C_4$-alkyl, methoxy, ethoxy, phenoxy, phenyl, nitro or $SO_2T$, where T is hydroxyl or $C_1$-$C_4$-alkoxy, or is phenoxy which is unsubstituted or substituted by chlorine, bromine, $C_1$-$C_4$-alkyl, methoxy or ethoxy, or is substituted or unsubstituted amino or is unsubstituted or substituted alkyl or aryl, $Y^2$ hydrogen, chlorine, bromine, $C_1$-$C_4$-alkyl, methoxy or ethoxy, or $Y^1$ and $Y^2$ together are a fused benzo ring, $Y^3$ is hydrogen, chlorine, bromine, $C_1$-$C_4$-alkyl, hydroxyl, methoxy or ethoxy, $Y^4$ is hydrogen, chlorine, bromine, $C_1$-$C_4$-alkyl, methoxy, ethoxy, hydroxyl, phenoxy or phenyl, or $Y^3$ and $Y^4$ together are a fused benzo ring and Z is hydroxyl, amino or —$NHR^1$, and the ring A may additionally be monosubstituted or polysubstituted by chlorine, bromine, nitro, $C_1$-$C_4$-alkyl, $C_1$-$C_4$-alkoxy, phenoxy, amino, $C_1$-$C_4$-alkylamino, di-$C_1$-$C_4$-alkylamino, acylamino or phenyl.

Specific examples of radicals R are $CH_3$, $C_2H_5$, $C_3H_7$, $C_4H_9$, $C_5H_{11}$, $C_6H_{13}$, $C_8H_{17}$,

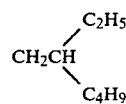

$CH_2CHOHCH_3$, $(CH_2)_4OH$, $(CH_2)_6OH$, $C_2H_4OCH_3$, $C_2H_4OC_2H_5$, $C_2H_4OC_4H_9$,

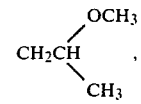

$(CH_2)_3OC_2H_4OCH_3$, $(CH_2)_3OC_2H_4OC_2H_5$, $(CH_2)_3OC_2H_4OC_4H_9$, $(CH_2)_3OC_2H_4OC_6H_5$, $C_2H_4CN$, $C_2H_4COOCH_3$, $C_2H_4COOC_2H_5$, $C_2H_4COOC_4H_9$, $CH_2COOCH_3$, $CH_2COOC_2H_5$, $CH_2COOC_4H_9$, $CH_2COOH$, $C_2H_4OCOCH_3$, $C_2H_4OCOC_2H_5$, $C_2H_4CONHCH_3$, $C_2H_4CONHC_2H_5$, $C_2H_4CONHC_3H_7$, $C_2H_4C_6H_5$, $C_6H_5$, $C_6H_4Cl$, $C_6H_4CH_3$, $COOCH_3$, $COOC_2H_5$, $COOC_3H_7$, $COOC_4H_9$, $CONHCH_3$, $CONHC_2H_5$, $CONHC_4H_9$ and $CONC_6H_5$.

Specific examples of radicals $SO_2T$ are $SO_3H$, $SO_3CH_3$, $SO_3C_4H_9$, $SO_3C_6H_5$, $SO_3C_6H_4CH_3$, $SO_3C_4H_4Cl$, $SO_3C_6H_4C_2H_5$, $SO_3C_6H_3(CH_3)_2$, $SO_3C_6H_3Cl_2$, $SO_3C_6H_4OCH_3$, $SO_2NH_2$, $SO_2NHCH_3$, $SO_2NHC_2H_5$, $SO_2NHC_3H_7$, $SO_2NHC_4H_9$, $SO_2NHC_6H_{13}$, $SO_2N(C_2H_5)$, $SO_2N(C_4H_9)_2$, $SO_2NHCHCH_2OCH_3$, $SO_2NHC_2H_4OC_2H_5$, $SO_2NH(CH_2)_3OC_2H_5$, $SO_2NH(CH_2)_3N(CH_3)_2$, $SO_2NH(CH_2)_3N(C_4H_9)_2$, $SO_2NHC_2H_4N(CH_3)_2$, $SO_2NHC_6H_5$, $SO_2CH_3$, $SO_2C_2H_5$, $SO_2C_4H_9$, $SO_2C_6H_5$, $SO_2C_6H_4CH_3$, $SO_2CH_2CH_2OH$, $SO_2CH_2CH_2OCH_3$, $SO_2CH_2CH_2N(CH_3)_2$,

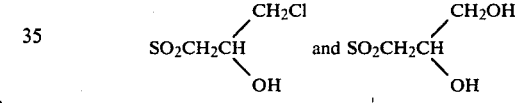

Acylamino radicals which may be present in the ring A are formylamino, acetylamino, propionylamino, benzoylamino, chlorobenzoylamino, methylbenzoylamino and methylchlorobenzoylamino.

A compound of the formula I may be prepared by (a) condensing a compound of the formula

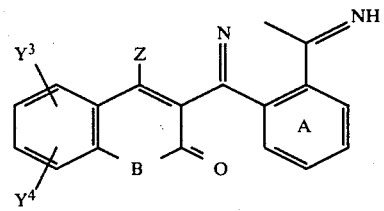

with a compound of the formula

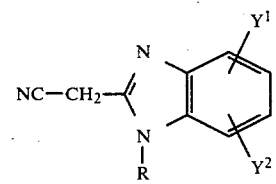

or (b) condensing a compound of the formula

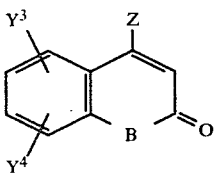

with a compound of the formula

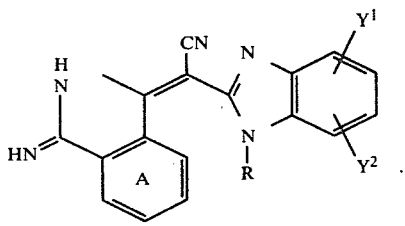

The reactions are known in principle. Details may be found in the Examples, where parts and percentages are by weight, unless stated otherwise.

Compounds of particular importance are those of the formula I a

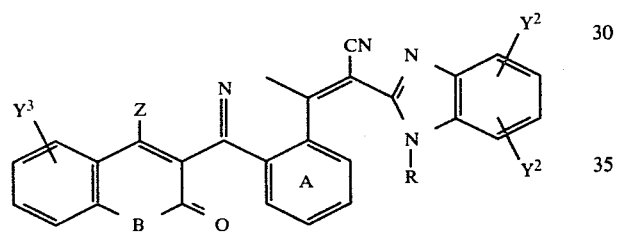

where B, R, $Y^2$, $Y^3$ and Z have the above meanings and the ring A may be substituted by methyl, ethyl, methoxy or ethoxy.

Preferably, B is oxygen, $Y^2$ is hydrogen, chlorine, methyl, methoxy or ethoxy, $Y^3$ is hydrogen, chlorine or methyl, Z is hydroxyl and R is $-CH_3$, $-C_2H_5$, $-C_3H_7$ or $-C_4H_9$.

The compounds of the formula I are yellow to red and are suitable as dyes for dyeing textiles consisting of natural or synthetic fibers, especially polyesters. The dyeings obtained have excellent fastness characteristics, amongst which the lightfastness, fastness to thermofixing and wetfastness may be singled out.

Some of the dyes are also suitable for the mass coloring of thermoplastics and some for the process described in German Patent 1,811,796.

EXAMPLE 1

6.9 parts of 1-imino-3-(4'-hydroxycoumarin-3'-yl)isoindoline and 4.3 parts of 1-methyl-2-cyanomethyl-benzimidazole in 50 parts by volume of glacial acetic acid are heated very rapidly to the reflux temperature and stirred thereat for 30 minutes. The reaction mixture is then cooled and the dye which has precipitated is filtered off and washed with methanol. 6.5 parts of the dye of the formula

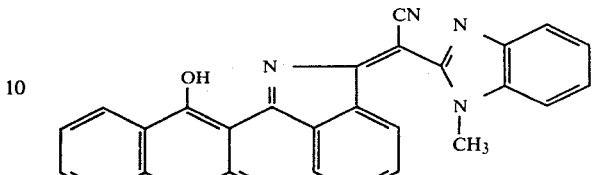

are obtained, having a melting point of 265°–267° C.

EXAMPLE 2

3.9 parts of the monocondensation product of 1,3-diimino-isoindoline and 1-methyl-2-cyanomethyl-benzimidazole are stirred with 2.1 parts of 4-hydroxycoumarin in 30 parts by volume of acetic acid and 10 parts by volume of acetic anhydride for 30 minutes at 100° C. The reaction mixture is cooled and the dye which has precipitated is filtered off and washed with methanol. 4.5 parts of a compound which is identical with the dye from Example 1 and has a melting point of 270°–274° C. are obtained.

EXAMPLE 3

4.8 parts of 1-methyl-2-cyanomethyl-benzimidazole are added to 5.8 parts of 1,3-diiminoisoindoline in 30 parts by volume of dimethylformamide at room temperature. The reaction mixture is then stirred for 4 hours at room temperature. Thereafter, 4.5 parts of 4-hydroxycoumarin and 3 parts by volume of acetic anhydride are added and the reaction mixture is heated at 100° C. After 30 minutes, it is cooled and the dye which has precipitated is filtered off and washed with methanol. 9.9 parts of a dye which is identical with the dye from Example 1 and has a melting point of 268°–273° C. are obtained.

The Table which follows lists further dyes of the formula

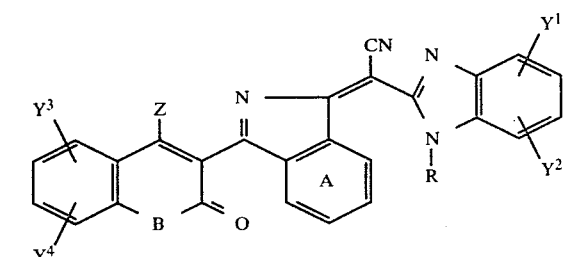

which are obtained from the corresponding starting materials by following a method similar to Example 1, 2 or 3.

| Example | $Y^1$ | $Y^2$ | $Y^3$ | $Y^4$ | A | B | Z | R | Melting range °C. | Hue on polyester |
|---|---|---|---|---|---|---|---|---|---|---|
| 4 | $CH_3$ | H | H | H | unsubstituted | O | OH | $CH_3$ | 268–72 | red |
| 5 | $CH_3$ | H | H | H | " | O | OH | $C_2H_5$ | 213–218 | red |
| 6 | H | H | H | H | " | O | OH | $C_2H_5$ | 310–320 | red |
| 7 | H | H | H | H | " | O | $NH_2$ | $CH_3$ | 242–244 | yellow |
| 8 | H | H | H | H | " | O | $NH-C_4H_9$ | $CH_3$ | 245–248 | yellow |
| 9 | H | H | $CH_3$ | H | " | O | OH | $C_2H_5$ | 290–295 | red |

-continued

| Example | $Y^1$ | $Y^2$ | $Y^3$ | $Y^4$ | A | B | Z | R | Melting range °C. | Hue on polyester |
|---|---|---|---|---|---|---|---|---|---|---|
| 10 | H | H | H | H | " | O | OH | $CH_2-C_6H_5$ | 255-262 | red |
| 11 | H | H | H | H | " | O | OH | n-Hexyl | 198-201 | red |
| 12 | Cl | Cl | H | H | " | O | OH | $C_2H_5$ | 290-292 | red |
| 13 | H | H | H | H | " | O | OH |  | 255-260 | red |
| 14 | H | H | H | H | " | O | OH |  | 240-245 | red |
| 15 | H | H | H | H | " | O | OH | $C_3H_7-n$ | 230-235 | red |
| 16 | H | H | H | H | " | O | OH | $n\text{-}C_4H_9$ | 225-230 | red |
| 17 | $CH_3$ | H | H | H | " | O | OH | $n\text{-}C_3H_7$ | 195-198 | red |
| 18 | H | H | $CH_3$ | H | " | O | OH | $CH_3$ | 219-224 | red |
| 19 | H | H | H | H | " | NH | OH | $CH_3$ | >320 | red |
| 20 | H | H | H | H | " | $N-CH_3$ | OH | $CH_3$ | 215-224 | red |
| 21 | $CH_3$ | H | H | H | " | NH | OH | $CH_3$ | 285-295 | red |
| 22 | $CH_3$ | H | H | H | " | NH | OH | $C_2H_5$ | 290-295 | red |
| 23 | H | H | H | H | " | $N-CH_3$ | OH | $C_2H_5$ | 200-205 | red |
| 24 | Cl | Cl | H | H | " | " | OH | $CH_3$ | 230-235 | red |
| 25 | Cl | Cl | H | H | " | NH | OH | $C_2H_5$ | 280-285 | red |
| 26 | H | H | 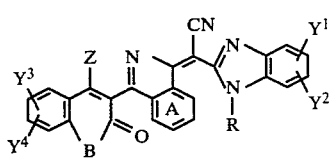 | | " | O | OH | $CH_3$ | >300 | red |
| 27 | H | H | " | | " | O | OH | $C_2H_5$ | >300 | red |
| 28 | Cl | H | Cl | H | " | O | OH | $CH_3$ | 290-295 | red |
| 29 | H | H | H | H | " | S | OH | H | | red |
| 30 | H | H | H | H | " | S | OH | $CH_3$ | | red |
| 31 | H | H | H | H | " | S | OH | $C_2H_5$ | | red |

We claim:

1. A heterocyclic compound which in one of the possible tautomeric forms corresponds to the formula (I):

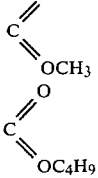

where (a) B is oxygen, sulfur, NH or $$-\overset{1}{N}-R^1;$$

(b) R is $C_1$-$C_8$-alkyl which may or may not be interrupted by oxygen and is unsubstituted or substituted by hydroxyl, phenoxy, cyano, $C_1$-$C_4$-alkoxycarbonyl, hydroxycarbonyl, $C_1$-$C_4$-alkanoyloxy, —$CONH_2$, —$CONHCH_3$, —$CONHC_2H_5$, —$CONHC_3H_7$ or phenyl; or is phenyl which is unsubstituted or substituted by chlorine, bromine, methyl, ethyl, methoxy or ethoxy; or is $C_1$-$C_4$-alkoxycarbonyl or cyano; or is —$CONH_2$, $CONHCH_3$, —$CONHC_2H_5$, —$CONHC_4H_9$ or $CONHC_6H_5$; or if B is sulfur, NH or $$-\overset{1}{N}-R^1,$$

may also be hydrogen, (c) $R^1$ is $C_1$-$C_4$-alkyl or benzyl;
(d) $Y^1$ is hydrogen, chlorine, bromine, $C_1$-$C_4$-alkyl, methoxy, ethoxy, phenoxy, phenyl, nitro or $SO_2T$;
(e) T is hydroxyl or $C_1$-$C_4$-alkoxy; or is phenoxy which is unsubstituted or substituted by chlorine, bromine, $C_1$-$C_4$-alkyl, methoxy or ethoxy; or is $NH_2$, $NHCH_3$, $NHC_2H_5$, $NHC_3H_7$, $NHC_4H_9$, $NHC_6H_{13}$, $N(C_2H_5)_2$, $N(C_4H_9)_2$, $NHCHCH_2OCH_3$, $NHC_2H_4OC_2H_5$, $NH(CH_2)_3OC_2H_5$, $NH(CH_2)_3N(CH_3)_2$, $NH(CH_2)_3N(C_4H_9)_2$, $NHC_2H_4N(CH_3)_2$, $NHC_6H_5$, $CH_3$, $C_2H_5$, $C_4H_9$, $C_6H_5$, $C_6H_4CH_3$, $CH_2CH_2OH$, $CH_2CH_2OCH_3$, $CH_2CH_2N(CH_3)_2$, $CH_2CH(OH)CH_2Cl$ or $CH_2CH(OH)CH_2OH$;

(f) $Y^2$ is hydrogen, chlorine, bromine, $C_1$-$C_4$-alkyl, methoxy or ethoxy;
(g) $Y^3$ is hydrogen, chlorine, bromine, $C_1$-$C_4$-alkyl, hydroxyl, methoxy or ethoxy,
(h) $Y^4$ hydrogen, chlorine, bromine, $C_1$-$C_4$-alkyl, methoxy, ethoxy, hydroxyl, phenoxy, phenyl, or $Y^3$ and $Y^4$ together are a fused benzo ring;
(i) Z is hydroxyl, amino or —$NHR^1$; and the ring A may additionally be monosubstituted or polysubstituted by chlorine, bromine, nitro, $C_1$-$C_4$-alkyl, $C_1$-$C_4$-alkoxy, phenoxy, amino, $C_1$-$C_4$-alkylamino, di-$C_1$-$C_4$-alkylamino, formylamino, acetylamino, propionylamino, benzoylamino, chlorobenzoylamino, methylbenzoylamino, methylchlorobenzoylamino or phenyl.

2. The compound as claimed in claim 1 of the formula (Ia)

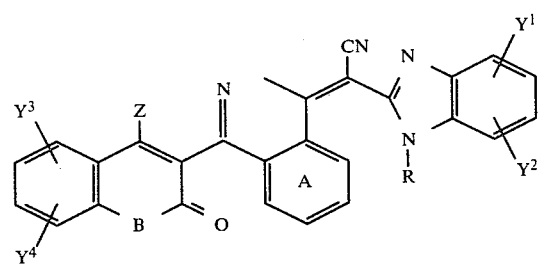

where $B,R,Y^2,Y^3$ and Z have the meanings given in claim 1 and wherein the ring A is substituted by methyl, ethyl, methoxy or ethoxy.

* * * * *